(12) United States Patent
Wang

(10) Patent No.: US 6,759,634 B2
(45) Date of Patent: Jul. 6, 2004

(54) ELECTRIC FRYER

(76) Inventor: Donglei Wang, No. 4 Workshop Building, Pinglanyuan Industrial Zone Nanping Town, Zhuhai (CN), 519060

( * ) Notice: Subject to any disclaimer, the term of this patent is extended or adjusted under 35 U.S.C. 154(b) by 0 days.

(21) Appl. No.: 10/174,917

(22) Filed: Jun. 19, 2002

(65) Prior Publication Data

US 2003/0047554 A1 Mar. 13, 2003

(30) Foreign Application Priority Data

| Sep. 11, 2001 | (CN) | ................................... | 01255707 U |
| Sep. 11, 2001 | (CN) | ................................... | 01255709 U |
| Dec. 12, 2001 | (CN) | ................................... | 01258687 U |

(51) Int. Cl.[7] ............................................. A47J 37/12
(52) U.S. Cl. .......................... 219/433; 219/435; 99/403
(58) Field of Search ............................. 219/430, 433, 219/435, 436, 439, 441, 442; 99/403

(56) References Cited

U.S. PATENT DOCUMENTS

| 2,269,689 | A | * | 1/1942 | Reichold | ..................... | 219/435 |
| 2,543,052 | A | * | 2/1951 | Park | ........................... | 219/433 |
| 4,458,139 | A | * | 7/1984 | McClean | ................... | 219/433 |
| 6,191,393 | B1 | * | 2/2001 | Park | ............................. | 219/439 |
| 6,340,807 | B2 | * | 1/2002 | Wang | .......................... | 219/430 |
| 6,365,878 | B1 | * | 4/2002 | Lau et al. | .................... | 219/430 |
| 6,388,236 | B1 | * | 5/2002 | Chang | ......................... | 219/435 |

FOREIGN PATENT DOCUMENTS

| DE | 8915662.5 | * | 1/1991 |
| EP | 705554 | * | 4/1996 |
| GB | 2298780 | * | 9/1996 |
| GB | 2321778 | * | 7/1998 |

* cited by examiner

Primary Examiner—Joseph Pelham
(74) Attorney, Agent, or Firm—Welsh & Katz, Ltd.

(57) ABSTRACT

This utility model provides an electric fryer that is composed of shell, fryer proper, electrothermal components, temperature control components and control box, its electrothermal components, temperature control components and fryer proper are fixed together, the control box can be separated from the fryer proper and the shell. The temperature probe with thermal resistor encapsulated inside and the safety probe with fuse encapsulated inside are tightly held and fixed to the bottom of the fryer proper, its outlets are plugged with the control box when the fryer is in use. When washing, the fryer proper, the shell and the control box can be separated from one another, therefore, the fryer proper and the shell can be bathed in water for washing. This electric fryer is suitable for household use, for it is easy and safe to use, and can be washed thoroughly.

4 Claims, 6 Drawing Sheets

ELECTRIC FRYER

TECHNICAL FIELD

The present utility model relates to one kind of electric cooking utensil, and more particularly relates to an electric fryer.

TECHNICAL BACKGROUND

Conventional electric fryers are composed of shell, fryer proper, electrothermal components as well as temperature control unit, the electrothermal components are in contact with the fryer proper and convey heat, while the temperature sensors are fixed on the shell directly or indirectly. Since the temperature sensors (including temperature controller, fuse and thermal resistor) can not be dipped into water, it is very inconvenient while washing the fryer proper and the shell.

CONTENTS OF INVENTION

The purpose of this utility model is to provide an electric fryer where the fryer proper and the temperature control components are coupled together but are separated from the control box and shell so that the fryer proper and the shell can be dipped into water as a whole for washing.

According to one aspect of this utility model, the electric fryer is composed of shell, fryer proper, electrothermal components, temperature control components as well as control box, which is characterized by that the temperature control components are coupled with the fryer proper and the control circuit that usually can not be dipped into water is installed in a control box, and connection of the fryer proper with the control box adopts plug-in method, a guiding hole is provided on the shell in a position corresponding to outlet of the fryer proper, providing support and guidance for the control box, and the control box can be separated completely from the fryer proper and the shell.

Temperature control components (including thermal resistor and fuse) are encapsulated in the various metallic probes, the temperature control probe is encapsulated with thermal resistor inside, and its outlet is a two-pole plug, the safety probe is encapsulated with a fuse inside and its outlet is two metallic strips, these two probes are fixed to the bottom of the fryer proper, and their outlets are exposed from wall surface of the fryer proper for connection with the jacks of the control box.

The circuit is provided inside the control box, and jacks are provided on the side of the control box to correspond with the outlets of the fryer proper, the control box is plugged with the fryer proper through the guiding hole of the shell for power connection.

The fryer proper, shell and the control box can be separated from one another, and the fryer proper and the shell can be bathed into water for washing.

According to the second aspect of the utility model, the electric fryer is composed of fryer proper, shell, electrothermal components, temperature control components, heat conducting unit as well as control box, which is characterized by that the electrothermal components, heat conducting components and the fryer proper are coupled together, and the temperature sensors and the control circuit that usually can not be dipped into water are installed in a control box, and connection of the fryer proper with the control box adopts plug-in and suck-in method, a guiding hole is provided on the shell in a position corresponding to outlet of the fryer proper, providing support and guidance for the control box, and the control box can be separated completely from the fryer proper and the shell.

A heat conducting unit is provided under the fryer proper and an iron block is fixed on the front end of the heat conducting unit; Magnet and iron chip are provided on the front side of the control box in a position corresponding to the heat conducting unit of the fryer proper, and jacks are also provided on the front side of the control box for metallic temperature probe and electrothermal tube, thermal resistor and fuse are encapsulated in the temperature probe which has compressing spring installed in the back.

When pulling out the control box along the shell, the control box, fryer proper and shell can be separated from each other, and the fryer proper and the shell can be bathed into water for washing.

According to the third aspect of this utility model, the electric fryer is composed of fryer proper, shell, electrothermal components, temperature control components as well as control box, the electrothermal components and the temperature control components are fixed inside the fryer proper, control circuit is installed inside the control box, and connection of the electrothermal components and the temperature control components with the control box adopts plug-in method, and the control box can be separated from the fryer proper and the shell.

The temperature control components include fuse and thermal resistor, which are all encapsulated in the bottom of a metallic enclosure; electrothermal tube is also installed at the bottom of the fryer proper, and the two pins of the electrothermal tube are respectively placed on the two outer sides of the temperature control box, and the pins of the temperature control components and the electrothermal tube are all exposed from the outer wall of the fryer proper.

Control circuit is installed inside the control box, on the end of which are provided jacks in correspondence with the pins of fuse, thermal resistor and electrothermal tube installed at the bottom of the fryer proper; a guiding hole is provided on the shell in correspondence with outgoing pins of the fryer proper, and the control box is plugged with the fryer proper through the guiding hole of the shell for power connection.

DESCRIPTION OF THE ATTACHED DRAWINGS

DETAILED DESCRIPTION OF THE EMBODIMENTS

Figure 1:
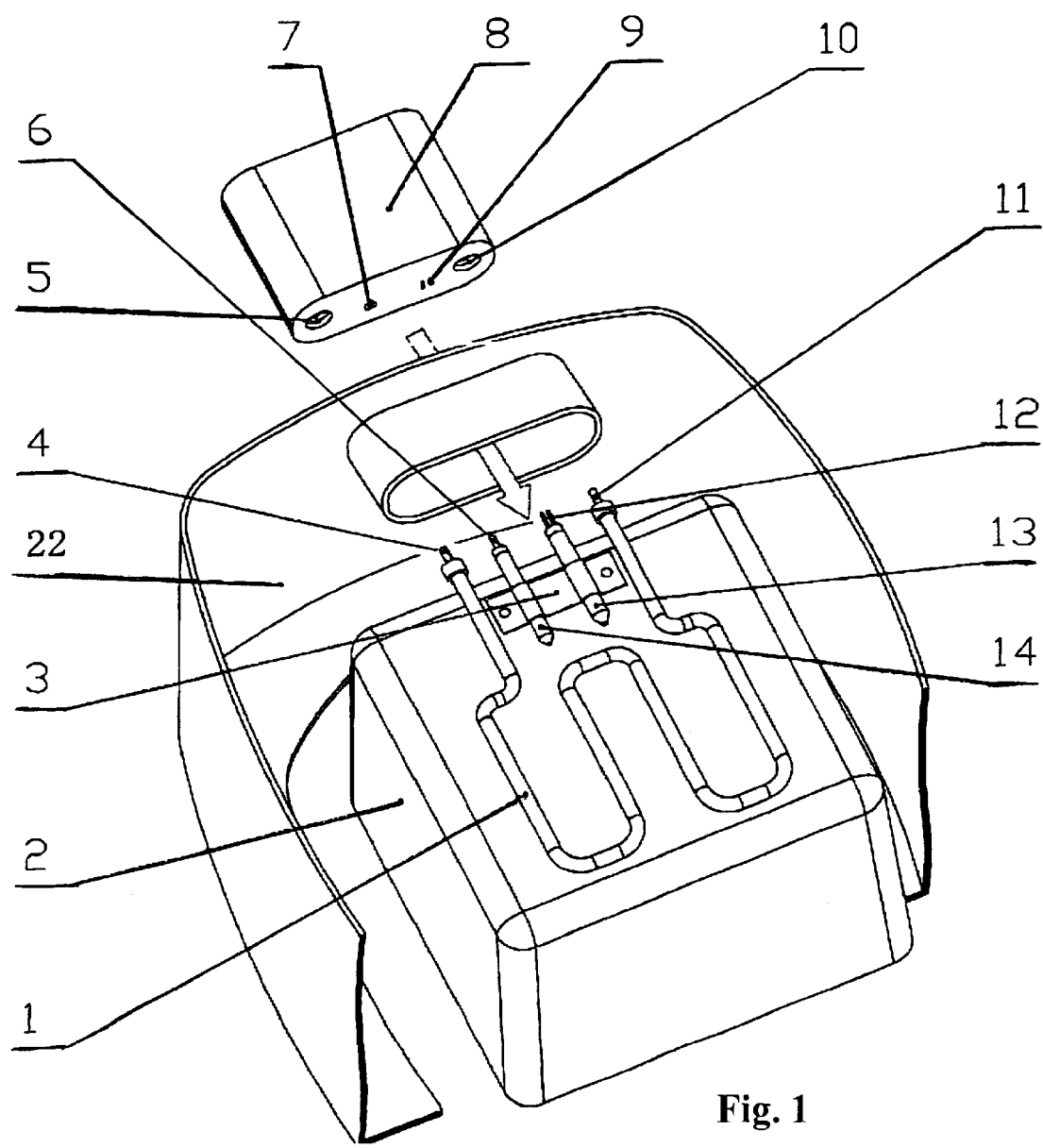
FIG. 1 is a schematic for provision of electrothermal components and temperature control components according to the first embodiment of this utility model.

In the drawings: 1—electrothermal tube 2—fryer proper 3—probe holding strip 4—pin No. 1 of electrothermal tube 5—jack No. 1 of electrothermal tube 6—two-pole plug 7—hole for temperature probe 8—control box 9—hole for safety probe 10—jack No. 2 of electrothermal tube 11—pin No. 2 of electrothermal tube 12—pin of safety probe 13—safety probe 14—temperature probe 15—metallic strip No. 2 16—arch strip No. 1 17—arch strip No. 2 18—two-pole wiring socket 19—metallic strip No. 1 20—fuse 21—thermal resistor 22—shell 23—1—heat conducting unit (FIG. 3) 33—jack of electrothermal tube 35—control box 9—electrothermal tube 10—fryer proper 11—copper strip 12—thermal resistor 13—compression spring No. 1 14—magnet 15—fuse 16—compression spring No. 2 317—shell 318—guiding hole 319—temperature sensor box 320—pin for fuse 321—jack for fuse 322—jack for thermal resistor 323—pin for thermal resistor 324—socket The following are further descriptions of the embodiments of this utility model in conjunction with these drawings attached:

First, a description of the first embodiment is given as follows.

Figure 2:
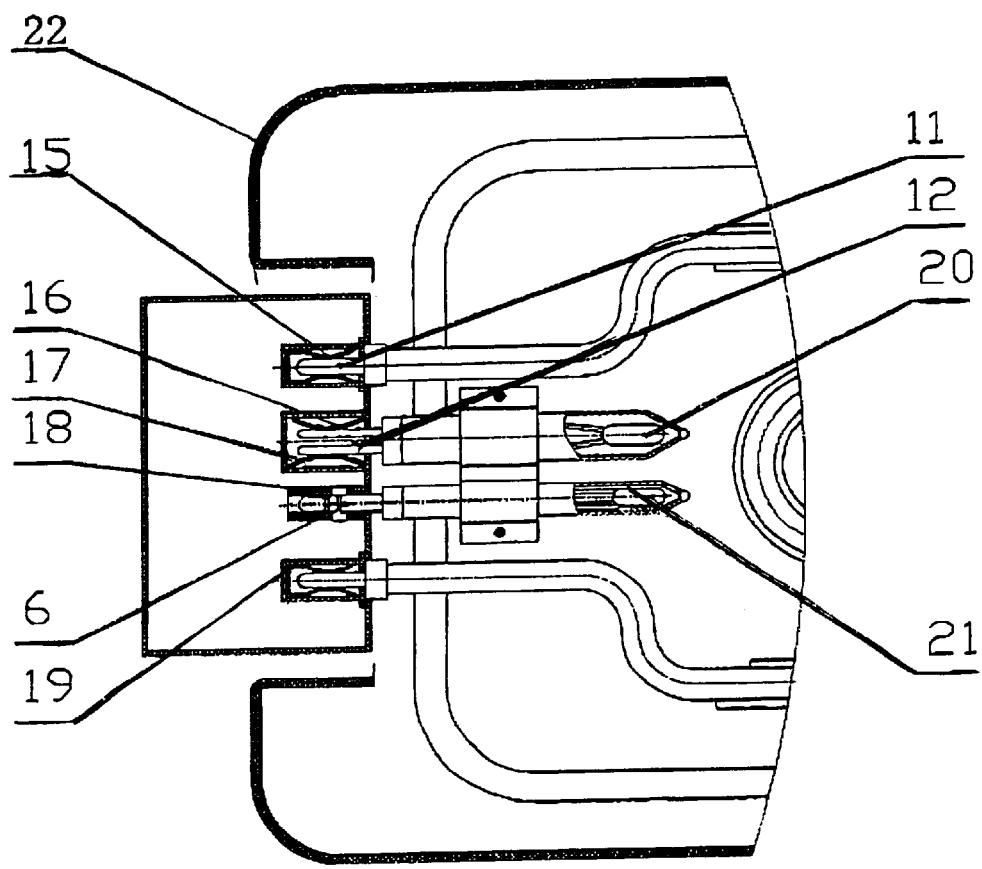
FIG. 2 is a schematic for connection between electrothermal components, temperature control components and the control box for according to the first embodiment of this utility model.

Referring to FIG. 1 and FIG. 2. The first embodiment of the fryer is composed of fryer proper 2, electrothermal tube 1, temperature control components 13 & 14 as well as control box 8, the temperature control components 13 & 14 are coupled with the fryer proper 2, and connection of the fryer proper 2 with the control box 8 adopts plug-in method, where the fryer proper 2 and the control box can be separated, a guiding hole is provided on the shell 22 in a position corresponding to outlet of the fryer proper 2, providing support and guidance for the control box 8, and can be completely separated from the control box 8.

Temperature control components (including thermal resistor 21 and fuse 20) are encapsulated in the various metallic probes, the temperature control probe 14 is encapsulated with thermal resistor 21 inside, and its outlet is a two-pole plug 6; the safety probe 13 is encapsulated with a fuse 20 inside and its outlet is two metallic strips 12, these two probes 13 & 14 are fixed to the bottom of the fryer proper 2 by probe holding strip 3, and their outlets are exposed from wall surface of the fryer proper 2 for connection with the jacks of the control box 8.

Control circuit is provided inside the control box 8, and jacks 5 & 10 are provided on the side of the control box 8, metallic strips 15 & 19 are provided inside the jacks which are power supply lead-in of the electrothermal tube 1; also provided is jack 7 for the temperature control probe, inside the jack is a two-pole wiring socket 18, which is the power supply lead-in for thermal resistor 21; further provided is jack 9 for the safety probe with arch strips 16 & 17 inside, which are power supply lead-in of fuse 20.

When the electric fryer is used to fry food, users can connect the various jacks of control box 8 to the plugs of fryer proper 2 through the guiding hole of the shell 22, then power is connected and electrothermal tube 1 heats up, and temperature probe 14 and safety probe 13 start to work, heating time of the electrothermal tube is controlled by the control circuit through on and off, where continued heating and over-heat fuse protection are realized in the entire course of preheating, temperature rise and food frying.

When washing the fryer, the control box is pulled out along the shell, and the fryer proper, shell and control box are separated from each other, thus, except for the control box, the fryer proper, shell and cover can all be washed in water.

The following is described about the second embodiment of this utility model.

Figure 3:
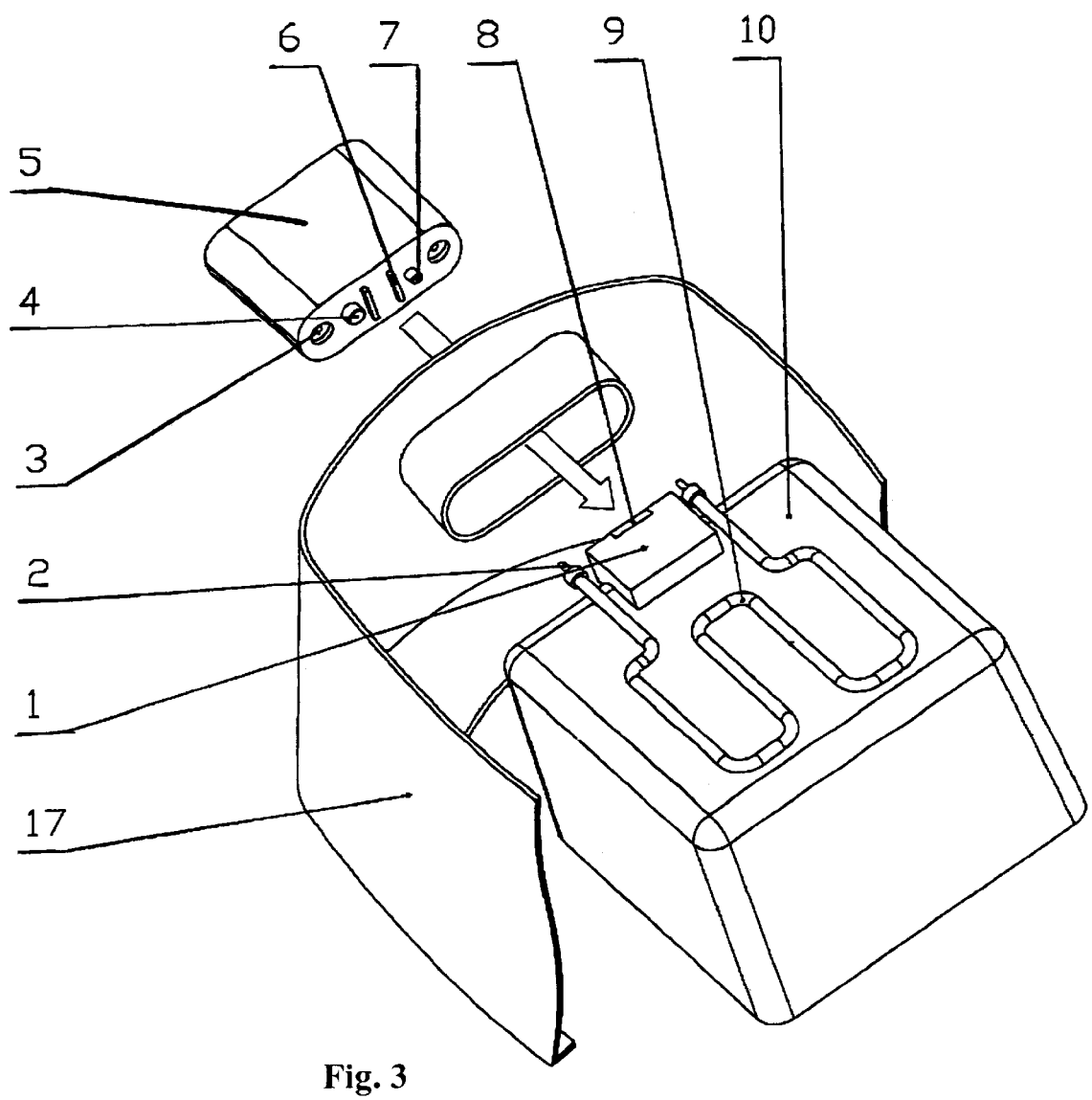
FIG. 3 is a schematic for provision of electrothermal components, heat conducting components and temerpature sensors according to the second embodiment of this utility model.
Figure 4:
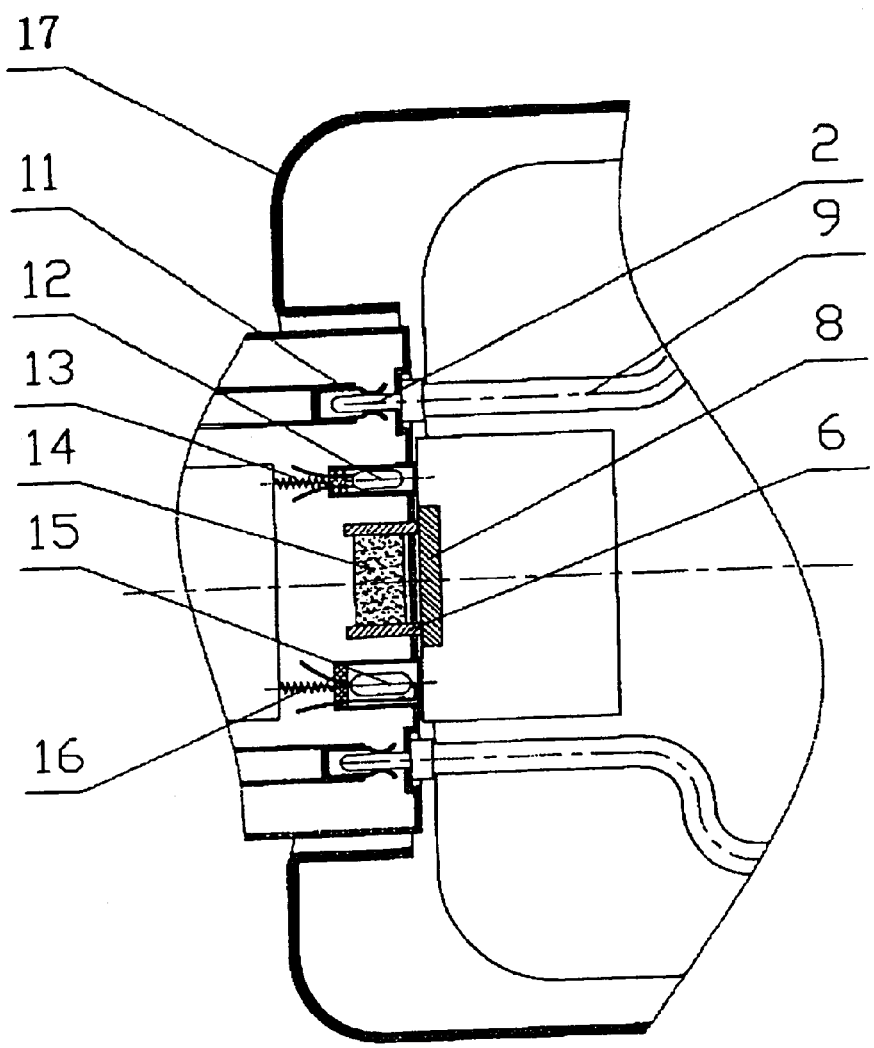
FIG. 4 is a schematic for connection between electrothermal components, heat conducting components and temerpature sensors according to the second embodiment of this utility model.

Referring to FIG. 3 and FIG. 4, in the second embodiment of this utility model, the fryer is composed of fryer proper 10, electrothermal tube 9, temperature control components, heat conducting unit 1, shell 17 as well as control box 5, where the electrothermal tube 9, heat conducting components and the fryer proper 10 are coupled together, and the temperature sensors and the control circuit that usually can not be dipped in water are installed in a control box 5, and connection of the fryer proper 10 with the control box 5 adopts suck-in method, and the fryer proper 10 and control box 5 can be completely separated from each other, a guiding hole is provided on the shell 17 in a position corresponding to outlet of the fryer proper 10, providing support and guidance for the control box 5, and can be completely separated from control box 5.

Referring to FIG. 3. A heat conducting unit 1 is provided under the fryer proper 10 and an iron block 8 is fixed on the front end of the heat conducting unit 1; two iron strips 6 are provided on the front side of the control box 5 in a position corresponding with the heat conducting unit 1 of the fryer proper, and temperature probes 4 & 7 are provided on the left hand side and right hand side of the iron strip 6, furthermore, two jacks 3 are provided on the outermost end of the two sides.

Referring to FIG. 4. In-between the two iron strips 6 inside the control box 5 is a magnet 14, fuse 15 is encapsulated in the temperature probe, thermal resistor 12 is encapsulated in temperature probe, and compression springs 13 & 16 are provided in both of the temperature probe, copper strip 11 is provided inside the jack 3 of electrothermal tube.

When the fryer is used food frying, the control box 5 can get close to fryer proper 10 through the guiding hole 318 of the shell 317, as a result of magnetic force, the iron strip 6 on the end of control box 5 will tightly close to the iron block 8 of the heat conducting unit, and pin 2 of the electrothermal tube comes in contact with the copper strip 11 inside the jack 3 of the electrothermal tube to get energized, in the meanwhile, temperature probes 4 & 7 come into close contact with the heat conducting unit 1 as a result of the compression springs 13 & 16, by which reliable temperature sensing of the fryer proper 10 is realized by the temperature probes 4 and 7, and heating time of the electrothermal component 1 is controlled by the control circuit through on and off, where continued heating and over-heat fuse protection are realized in the entire course of preheating, temperature rise and food frying.

When washing the fryer, the fryer proper 10 can be separated from the control box 5, thus, except for the control box, the fryer proper, shell and cover can all be washed in water.

The following is described about the third embodiment of this utility model.

Figure 5:
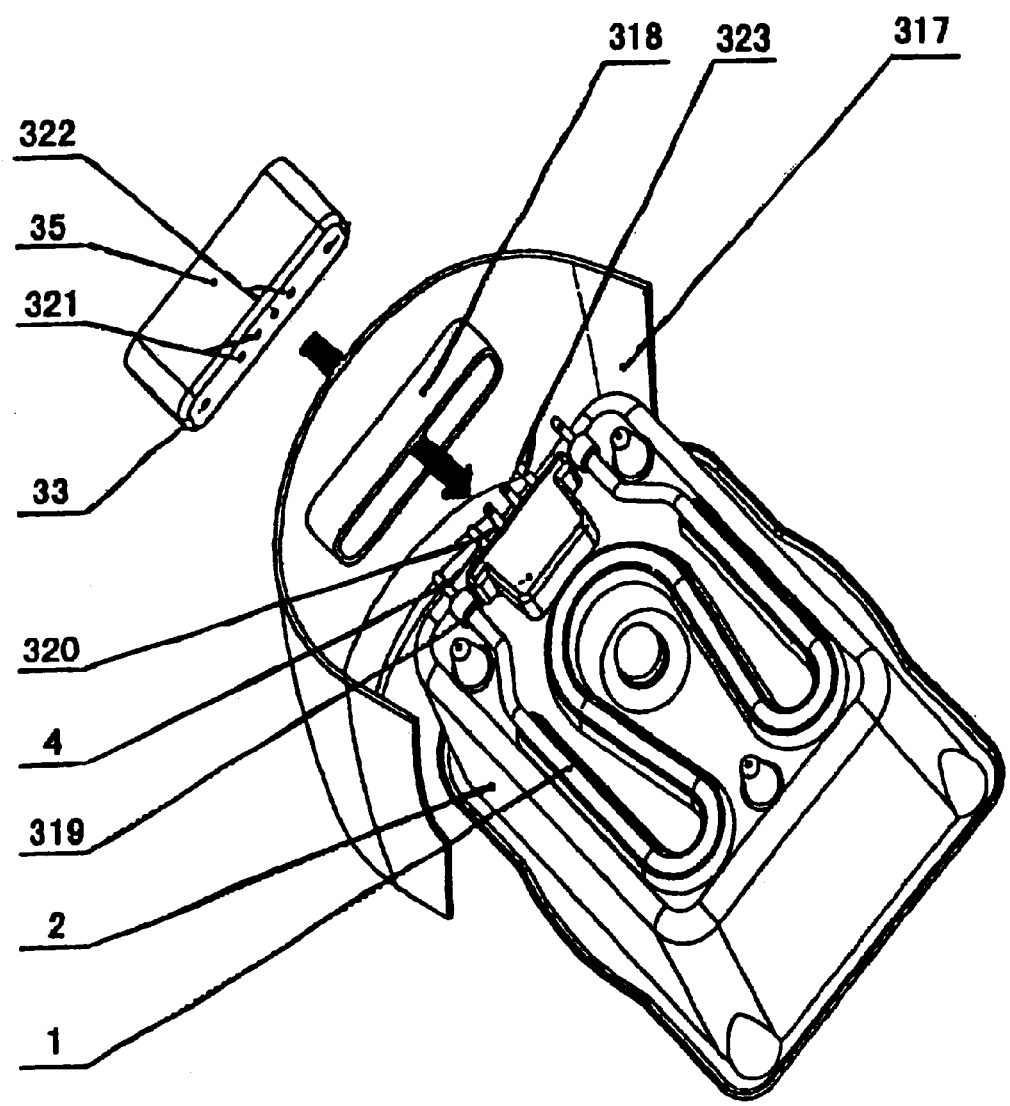
FIG. 5 is a schematic for provision of electrothermal components and temperature control components according to the third embodiment of this utility model.
Figure 6:
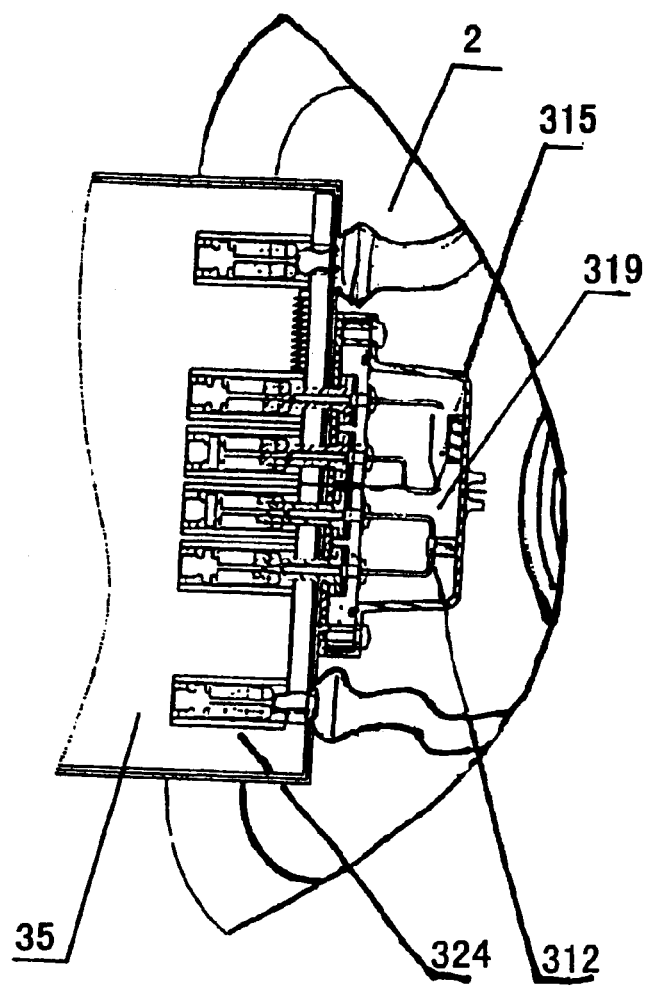
FIG. 6 is a schematic for connection between electrothermal components, temperature control components and the control box according to the fourth embodiment of this utility model.

Referring to FIG. 5 and FIG. 6. This utility model is composed of shell 317, fryer proper 2, electrothermal components 1, temperature control components 315 and 312 as well as control box 35, the electrothermal components 1 and the temperature control components 315 and 312 are fixed inside the fryer proper 2, control circuit that usually can not be bathed in water now is installed inside the control box 35, and connection of the electrothermal tube 1 and the temperature control components 315 and 312 with the control box 35 adopts plug-in method, a guiding hole 318 is provided on shell 317 to match pins 4, and 323 on the fryer proper, providing support and guidance for control box 35, the control box 35 can be separated from the fryer proper 2 and the shell 317 and the fryer proper 2 and shell 317 can be washed in water.

The temperature control components include fuse 315 and thermal resistor 312, which are all encapsulated in the bottom of a metallic temperature sensor enclosure 319 and metallic pins 320 and 323 are lead out from the enclosure 319, the temperature sensor box 319 is fixed at the bottom of the fryer proper 2, electrothermal tube 1 is also installed at the bottom of the fryer proper 2, and the two pins of the electrothermal tube 1 are respectively placed on the two outer sides of the temperature sensor enclosure, and the pins 4, 320 and 323 of the temperature control components 315 and 312 and the electrothermal tube 1 are all exposed from the outer wall of the fryer proper.

Control circuit is installed inside the control box 35, on the end of the control box 35 are provided jacks in correspondence with the pins 4, 320 and 323 of electrothermal tube (Jack 33), fuse (Jack 321) and thermal resistor (Jack 322) installed at the bottom of the fryer proper, Jacks 33, 321 and 322 on the control box 35 are connected with the various pins 4, 320 and 323 of the fryer proper 2.

When the electric fryer is used to fry food, the various pins 33, 321 and 322 of the control box 35 are connected with pins 320 and 323 of the fryer proper as well as pin 4 of the electrothermal tube through the guiding hole 318 of the shell, then, power is connected and electrothermal tube 1 heats up, and fuse 315 and thermal resistor 312 inside the temperature sensor enclosure 319 start to work, heating time of the electrothermal tube 1 is controlled by the control circuit through on and off, where continued heating and over-heat fuse protection are realized in the entire course of preheating, temperature rise and food frying.

When washing the fryer, the control box 35 is pulled out along the guiding hole 318 of the shell, and the fryer proper 2, shell 317 and control box 35 are separated from each other, thus, except for the control box 35, the fryer proper 2, shell 317 and cover can all be washed in water.

What is claimed is:

1. An electric fryer comprising a fryer proper, a shell, electrothermal components, temperature control components, a heat conducting unit and a control box, wherein the electrothermal components, heat conducting unit and the fryer proper are permanently affixed, and the temperature sensors and a control circuit are installed in the control box, and the control box is removably connected to the fryer proper, wherein the control box is capable of being separated completely from the fryer proper and the shell.

2. The electric fryer according to claim 1, wherein a heat conducting unit is provided under the fryer proper and an iron block is fixed on the front end of the heat conducting unit, two iron strips are provided on the front end of the control box to correspond with the heat conducting unit of the fryer proper, and a magnet is provided between the two iron strips, and jacks are further included on the front end of the control box for a metallic temperature probe and an electrothermal tube.

3. The electric fryer according to the claim 2, wherein a thermal resistor and a fuse are each encapsulated in a temperature probe with compressing springs installed in the rear thereof.

4. The electric fryer according to the claim 1, wherein a guiding hole is provided on the shell in a position corresponding to an outlet of the fryer proper, providing support and guidance for the control box, the control box being plugged to the fryer proper through the guiding hole of the shell for power connection, wherein the fryer proper, shell and the control box can be separated from one another.

* * * * *